US012808825B2

(12) United States Patent
Warner

(10) Patent No.: US 12,808,825 B2
(45) Date of Patent: Nov. 24, 2026

(54) METHOD AND APPARATUS FOR CHEMICAL ANALYSIS

(71) Applicant: Benjamin Peter Warner, Los Alamos, NM (US)

(72) Inventor: Benjamin Peter Warner, Los Alamos, NM (US)

( * ) Notice: Subject to any disclaimer, the term of this patent is extended or adjusted under 35 U.S.C. 154(b) by 41 days.

(21) Appl. No.: 19/060,724

(22) Filed: Feb. 23, 2025

(65) Prior Publication Data

US 2025/0290877 A1 Sep. 18, 2025

Related U.S. Application Data

(60) Provisional application No. 63/564,708, filed on Mar. 13, 2024.

(51) Int. Cl.

*G01N 23/223* (2006.01)
*G01N 1/36* (2006.01)
*G01N 23/2204* (2018.01)

(52) U.S. Cl.

CPC ............ *G01N 23/223* (2013.01); *G01N 1/36* (2013.01); *G01N 23/2204* (2013.01); *G01N 2001/364* (2013.01); *G01N 2223/076* (2013.01)

(58) Field of Classification Search

CPC .... G01N 23/223; G01N 1/36; G01N 23/2204; G01N 2001/364; G01N 2223/076

See application file for complete search history.

(56) References Cited

U.S. PATENT DOCUMENTS

2019/0346384 A1* 11/2019 Matsuda .............. G01N 23/223

* cited by examiner

*Primary Examiner* — Courtney D Thomas

(57) ABSTRACT

The present invention includes an apparatus for immobilizing resins for x-ray fluorescence measurement, including a substrate, a layer of double-sided tape having a plurality of blind holes, and a layer of single sided tape having a plurality of holes. The present invention includes an apparatus for holding samples for x-ray fluorescence analysis, including a substrate, a layer of double-sided tape having a plurality of blind holes, and a layer of single sided tape having a plurality of holes. The blind holes contain resin. The present invention includes a method for performing x-ray fluorescence analysis, including providing a sample holder having a substrate, double sided tape, and single sided tape. The single sided tape has a plurality of holes and the double-sided tape has a plurality of blind holes. The method includes providing a resin in the blind holes and obtaining an x-ray fluorescence spectrum of the resin.

16 Claims, 2 Drawing Sheets

METHOD AND APPARATUS FOR CHEMICAL ANALYSIS

CROSS-REFERENCE TO RELATED APPLICATIONS

The present application claims the benefit of Provisional Application No. 63/564,708 filed Mar. 13, 2024.

FEDERALLY SPONSORED RESEARCH AND DEVELOPMENT

This invention was made with government support under DE-SC0023924 awarded by the Department of Energy. The government has certain rights in the invention.

PRIOR ART

Miller, Thomasin C., Grace Mann, George J. Havrilla, Cyndi A. Wells, Benjamin P. Warner, and R. Tom Baker. "Micro-X-ray fluorescence as a general high-throughput screening method for catalyst discovery and small molecule recognition." Journal of Combinatorial Chemistry 5, no. 3 (2003): 245-252.

BACKGROUND OF THE INVENTION

Metal chelating resins are widely used in mineral extraction (Hardwick, Ed, Jenny Hardwick, and K. C. Sole. "An overview of the use of ion exchange to extract wealth from mine waters." In International Mine Waters Association Conference 2016. 2016.) and metal analysis (Garg, B. S., R. K. Sharma, N. Bhojak, and S. Mittal. "Chelating resins and their applications in the analysis of trace metal ions." Microchemical Journal 61, no. 2 (1999): 94-114.). The use of x-ray fluorescence for the analysis of metals bound to resins has been reported (Miller, Thomasin C., Grace Mann, George J. Havrilla, Cyndi A. Wells, Benjamin P. Warner, and R. Tom Baker. "Micro-X-ray fluorescence as a general high-throughput screening method for catalyst discovery and small molecule recognition." Journal of Combinatorial Chemistry 5, no. 3 (2003): 245-252.). There have been substantial improvements in the focusing of x-ray for x-ray fluorescence analysis, with benchtop x-ray fluorescence spectrometers now routinely having focusing optics that allow x-ray excitation to be focused to 7.5 microns. However, this narrow spatial focus requires improvements in methods to immobilize resins so that the x-ray excitation can be aligned with the resin being analyzed. Existing methods for immobilizing resins include placing a laser cut mask onto an adhesive coated slide. However, the process of laser cutting a mask often causes the mask to deform. Therefore, there remains a need for improved methods to immobilize resins for x-ray fluorescence measurement.

SUMMARY OF THE INVENTION

The present invention includes an apparatus for immobilizing resins for x-ray fluorescence measurement, comprising a substrate having a layer of double sided tape on the substrate and a layer of single sided tape on the double sided tape; the single sided tape comprising a plurality of holes extending through the single sided tape; and the double sided tape comprising a plurality of blind holes corresponding to the plurality of holes extending through the single sided tape.

The present invention also includes an apparatus for holding samples for x-ray fluorescence analysis, comprising a substrate having a layer of double sided tape on the substrate and a layer of single sided tape on the double sided tape; the single sided tape comprising a plurality of holes extending through the single sided tape; the double sided tape comprising a plurality of blind holes corresponding to the plurality of holes extending through the single sided tape; and a resin disposed in at least one of the blind holes of the double sided tape.

The present invention further includes a method for performing x-ray fluorescence analysis, comprising providing a sample holder, the sample holder comprising a substrate having a layer of double sided tape on the substrate and a layer of single sided tape on the double sided tape; wherein the single sided tape comprises a plurality of holes extending through the single sided tape and the double sided tape comprising a plurality of blind holes corresponding to the plurality of holes in the double sided tape; providing a resin disposed in at least one of the blind holes; and obtaining an x-ray fluorescence spectrum of the resin.

DETAILED DESCRIPTION OF THE INVENTION

Figure 1:
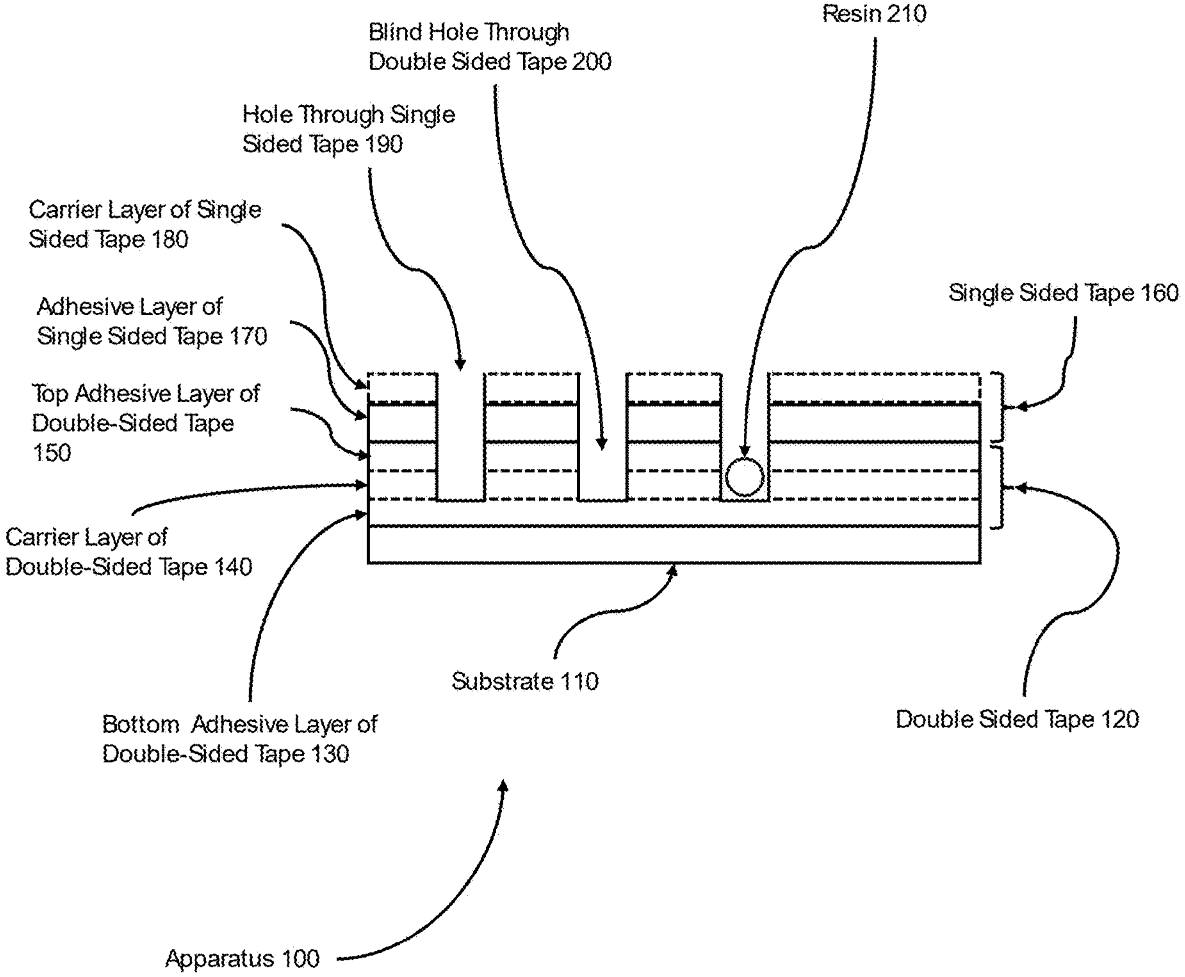
FIG. 1 shows a schematic depiction of an apparatus of the present invention.
Figure 2:
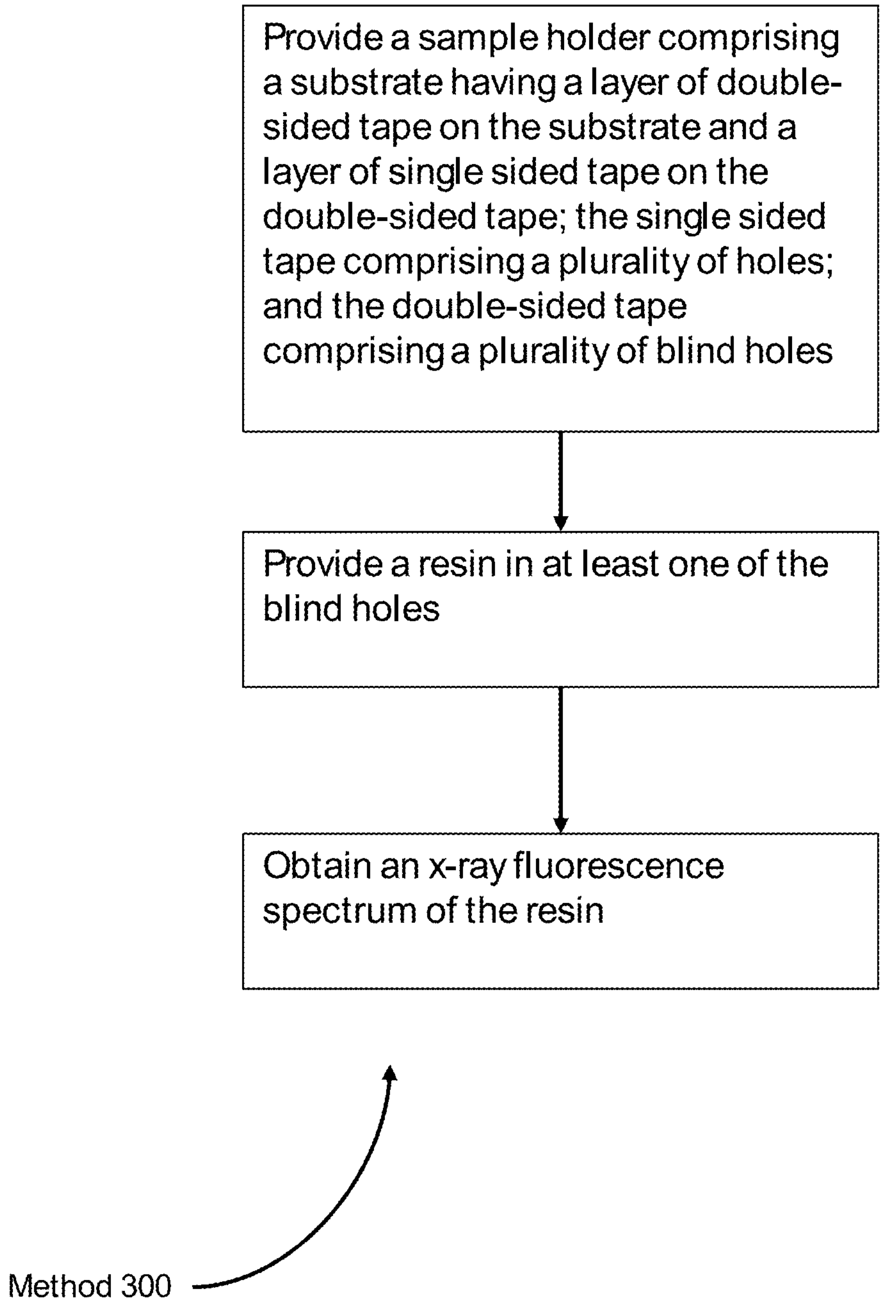
FIG. 2 shows a schematic depiction of the method of the present invention.

Briefly, the present invention includes an apparatus 100 for immobilizing resins for x-ray fluorescence measurement. Apparatus 100 comprises a substrate 110, and double sided tape 120 disposed on substrate 110, and single sided tape 160 disposed on double sided tape 120. Single sided tape 160 comprises a plurality of holes 190, and double sided tape comprises a plurality of blind holes 200 that correspond to the plurality of holes 190.

Substrate 110 may be conveniently provided by the use of acrylic sheets. Substrate 110 may also comprise glass, polyester, nylon, polyimide, polyaryletherketone, polyetheretherketone, and combinations thereof.

Double sided tape 120 comprises a bottom adhesive layer 130 which is adhered to substrate 110. Double sided tape 120 further comprises a carrier layer 140, which is disposed on the opposite face of bottom adhesive layer 130 from substrate 110. Double sided tape 120 further comprises a top adhesive layer 150 on the opposite face of carrier layer 140 from bottom adhesive layer 130.

Single sided tape 160 comprises carrier layer 180 and adhesive layer 170. Adhesive layer 170 is adhered to top adhesive layer 150. Carrier 180 is preferably a plastic that may be laser cut, and is more preferably a plastic that may be laser cut with a laser having a wavelength of 355 nm. Carrier 180 preferably comprises a material selected from the set consisting of polyester, nylon, polyimide, polyaryletherketone, polyetheretherketone, and combinations thereof. Holes 190 and blind holes 200 preferably have a cross sectional area of between 78 square microns and 17,662 square microns. Holes 190 and blind holes 200 preferably have a major axis of between 10 microns and 150 microns.

The present invention also includes an apparatus for holding samples. This embodiment of the present invention comprises a substrate 110, and double sided tape 120 disposed on substrate 110, and single sided tape 160 disposed on double sided tape 120. Single sided tape 160 comprises a plurality of holes 190, and double sided tape comprises a plurality of blind holes 200 that correspond to the plurality of holes 190. This apparatus further comprises a resin 210 which is disposed in at least one of the blind holes 200.

Resin 210 is preferably an ion exchange resin or a chelating resin. Resin 210 preferably comprises polystyrene or a copolymer of styrene. Resin 210 preferably further comprises a function group selected from an ether and an amide. Resin 210 preferably comprises a ligand for a metal. Resin 210 also preferably comprises at least one chemical element having an atomic number greater than 14. Resin 210 also preferably comprises at least one chemical element having an atomic number greater than 14, wherein the chemical element having an atomic number greater than 14 is present in an amount that is proportional to the ligand.

The present invention further includes a method for performing x-ray fluorescence analysis. The method includes the steps of providing a sample holder, the sample holder comprising a substrate having a layer of double sided tape on the substrate and a layer of single sided tape on the double sided tape. The single sided tape comprises a plurality of holes extending through the single sided tape and the double sided tape comprises plurality of blind holes corresponding to the plurality of holes in the double sided tape. The method further includes the steps of providing a resin disposed in at least one of the blind holes. The method also includes the step of obtaining an x-ray fluorescence spectrum of the resin.

The method preferably includes obtaining the x-ray fluorescence spectrum of at least two elements, and more preferably obtaining the x-ray fluorescence spectrum of at least two elements simultaneously.

The holes and blind holes provided in the method preferably have a cross sectional area of between 78 square microns and 17,662 square microns. The holes and blind holes provided in the method preferably have a major axis of between 10 microns and 150 microns. The single sided tape provided in the method preferably comprises a material selected from the set consisting of polyester, nylon, polyimide, polyaryletherketone, polyetheretherketone, and combinations thereof.

The resin provided in the method is preferably an ion exchange resin or a chelating resin. The resin preferably comprises polystyrene or a copolymer of styrene. The resin preferably further comprises a function group selected from an ether and an amide. The resin preferably comprises a ligand for a metal. The resin also preferably comprises at least one chemical element having an atomic number greater than 14. The resin also preferably comprises at least one chemical element having an atomic number greater than 14, wherein the chemical element having an atomic number greater than 14 is present in an amount that is proportional to the ligand.

EXAMPLES

Example 1: A sample of clear 3 mm thick acrylic was laser cut to dimensions of 25 mm by 75 mm. The acrylic was covered with double sided tape (3M™ Double Coated Tape 93015LE), and a layer of polyester high temperature masking tape (iVict, UPC 193078588874) was placed on the double sided tape. A set of 11,520 holes in the polyester tape and a set of 11,520 blind holes were laser cut using a 355 nm laser. The pocket holes were charged with Purolite C-100E Cationic Resin. The individual resin beads were measured using x-ray fluorescence.

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. An apparatus for immobilizing resins for x-ray fluorescence measurement, comprising:
- a. a substrate having a layer of double sided tape on said substrate and a layer of single sided tape on said double sided tape;
- b. said single sided tape comprising a plurality of holes extending through said single sided tape; and
- c. said double sided tape comprising a plurality of blind holes corresponding to said plurality of holes extending through said single sided tape.

2. The apparatus of claim 1, wherein said single sided tape comprises a backing comprising a material selected from polyester, nylon, polyimide, polyaryletherketone, polyetheretherketone, and combinations thereof.

3. The apparatus of claim 1, wherein said holes have a major axis between 10 microns and 150 microns.

4. The apparatus of claim 1, wherein said holes have a cross sectional area between 78 square microns and 17,662 square microns.

5. An apparatus for holding samples for x-ray fluorescence analysis, comprising:
- a. a substrate having a layer of double sided tape on said substrate and a layer of single sided tape on said double sided tape;
- b. said single sided tape comprising a plurality of holes extending through said single sided tape;
- c. said double sided tape comprising a plurality of blind holes corresponding to said plurality of holes extending through said single sided tape; and
- d. a resin disposed in at least one of the blind holes of the double sided tape.

6. The apparatus of claim 5, wherein said resin comprises a copolymer of styrene.

7. The apparatus of claim 5, wherein said resin comprises a functional group selected from an ether and an amide.

8. A method for performing x-ray fluorescence analysis, comprising:
- a. providing a sample holder, the sample holder comprising a substrate having a layer of double sided tape on the substrate and a layer of single sided tape on the double sided tape;
- b. wherein the single sided tape comprises a plurality of holes extending through the single sided tape and the double sided tape comprising a plurality of blind holes corresponding to the plurality of holes in the double sided tape;
- c. providing a resin disposed in at least one of the blind holes; and
- d. obtaining an x-ray fluorescence spectrum of the resin.

9. The method of claim 8, further comprising obtaining the x-ray fluorescence spectrum of at least two elements.

10. The method of claim 9, wherein the x-ray fluorescence measurements of the at least two elements are obtained simultaneously.

11. The method of claim 8, wherein the holes have a major axis between 10 microns and 150 microns.

12. The method of claim 8, wherein the holes have a cross sectional area between 78 square microns and 17,662 square microns.

13. The method of claim 8, wherein the single sided tape comprises a backing comprising a material selected from polyester, nylon, polyimide, polyaryletherketone, polyetheretherketone, and combinations thereof.

14. The method of claim 8, wherein the resin comprises a ligand for a metal.

15. The method of claim 14, wherein the resin comprises a chemical element having an atomic number greater than 14.

16. The method of claim 15, wherein the chemical element having an atomic number greater than 14 is present in an amount proportional to the ligand.

* * * * *